United States Patent

[11] 3,567,900

| [72] | Inventors | Jerome W. Nelson<br>Houston, Tex.;<br>Robert E. Pollock, Hilliard; Robert P.<br>Meister, Columbus, Ohio |
|---|---|---|
| [21] | Appl. No. | 756,721 |
| [22] | Filed | Aug. 14, 1968 |
| [45] | Patented | Mar. 2, 1971 |
| [73] | Assignee | The Battelle Development Corporation<br>Columbus, Ohio<br>Continuation-in-part of application Ser. No.<br>570,868, Aug. 8, 1966. |

[54] WELDING METHOD AND APPARATUS
15 Claims, 18 Drawing Figs.

[52] U.S. Cl............................................. 219/130,
219/137, 219/124
[51] Int. Cl................................................. B23k 9/26
[50] Field of Search........................................... 219/130-
—137, 124

[56] References Cited
UNITED STATES PATENTS

| 1,907,051 | 5/1933 | Emery.......................... | 219/137 |
| 2,407,746 | 9/1946 | Johnson....................... | 219/137 |
| 3,123,702 | 3/1964 | Keidel et al.................. | 219/130 |
| 3,328,556 | 6/1967 | Nelson et al................. | 219/124X |

*Primary Examiner*—J. V. Truhe
*Assistant Examiner*—J. G. Smith
*Attorney*—Gray, Mase and Dunson ABSTRACT: A method and apparatus for welding metal members wherein a consumable welding wire having a permanent set imparted thereto is directed into the joint and emerges at a constant predetermined angle toward one of the members. The wire is oscillated about its longitudinal axis during feeding whereby the emerging arcuate portion travels in a predetermined arcuate pattern within the joint.

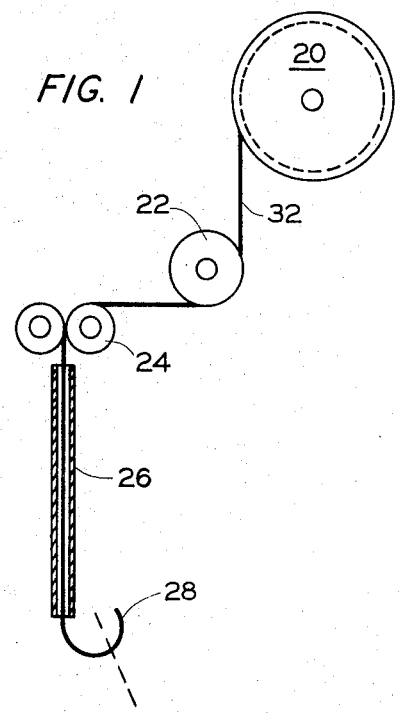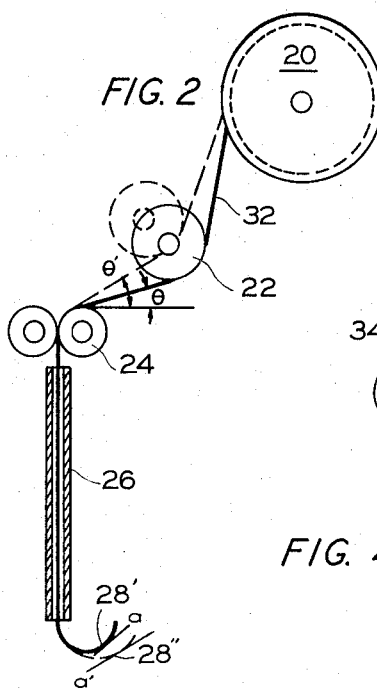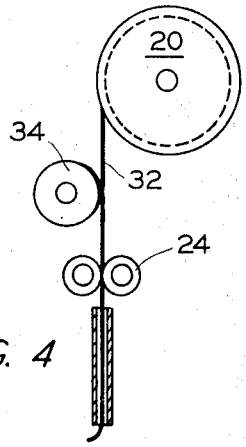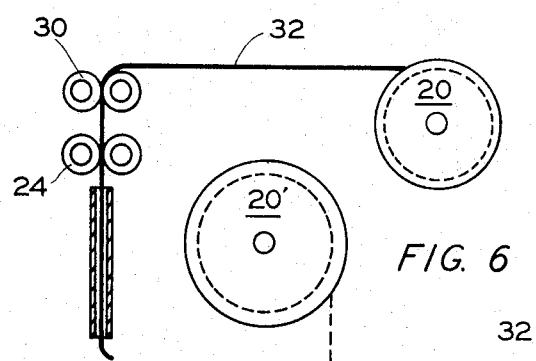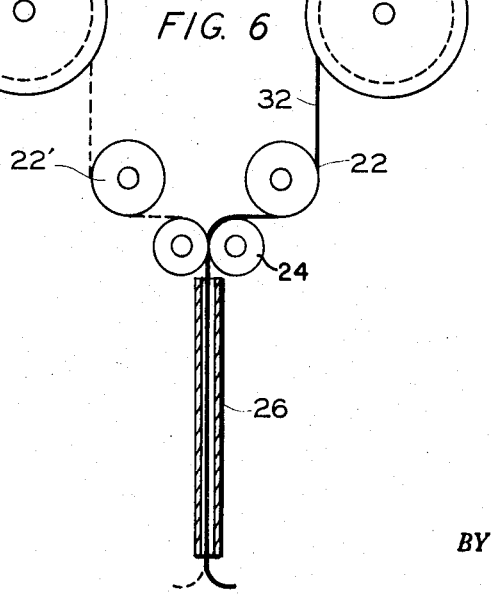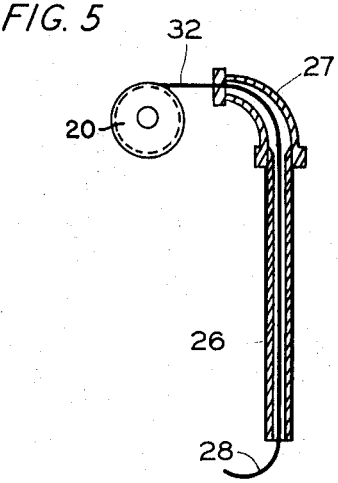

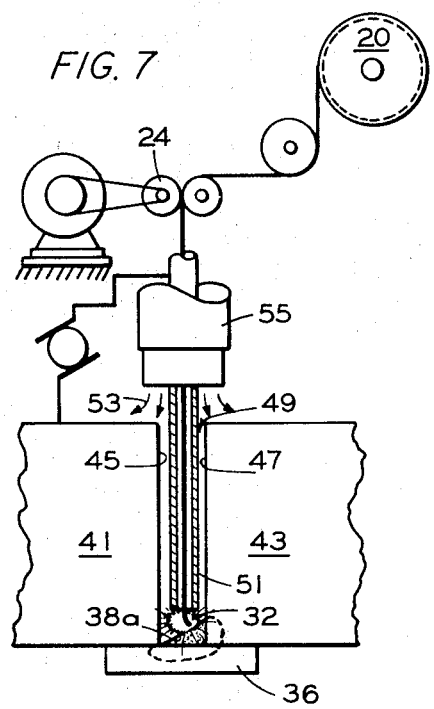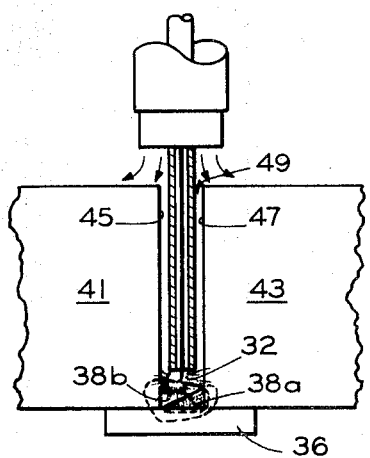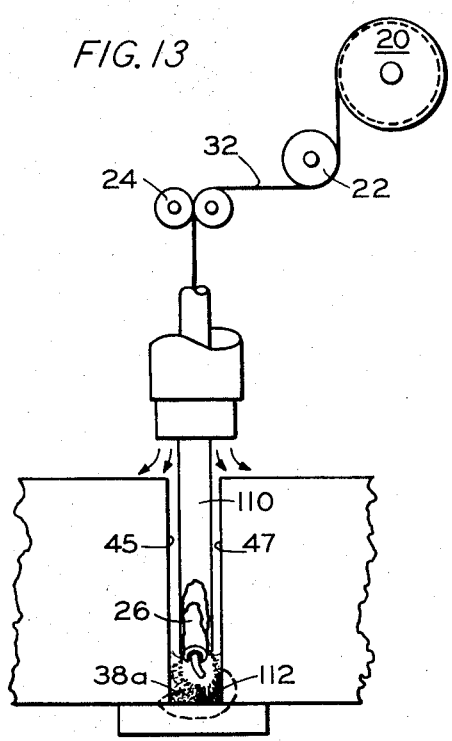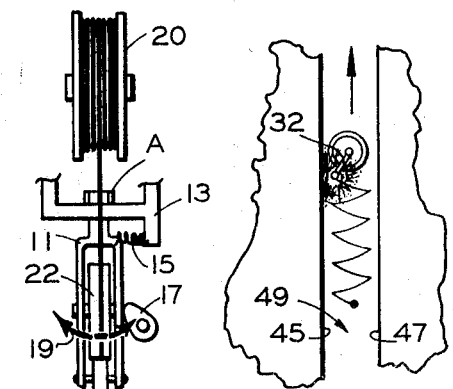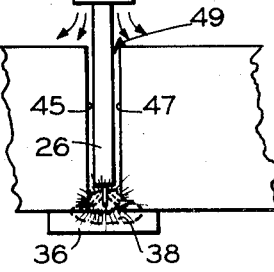

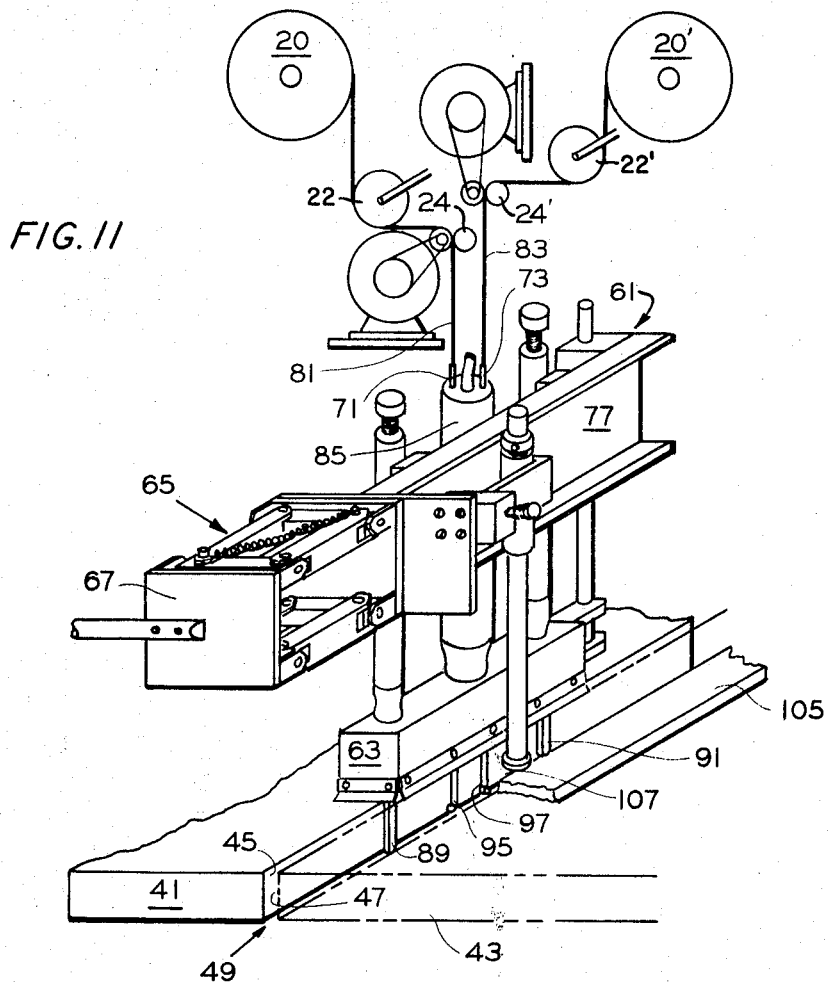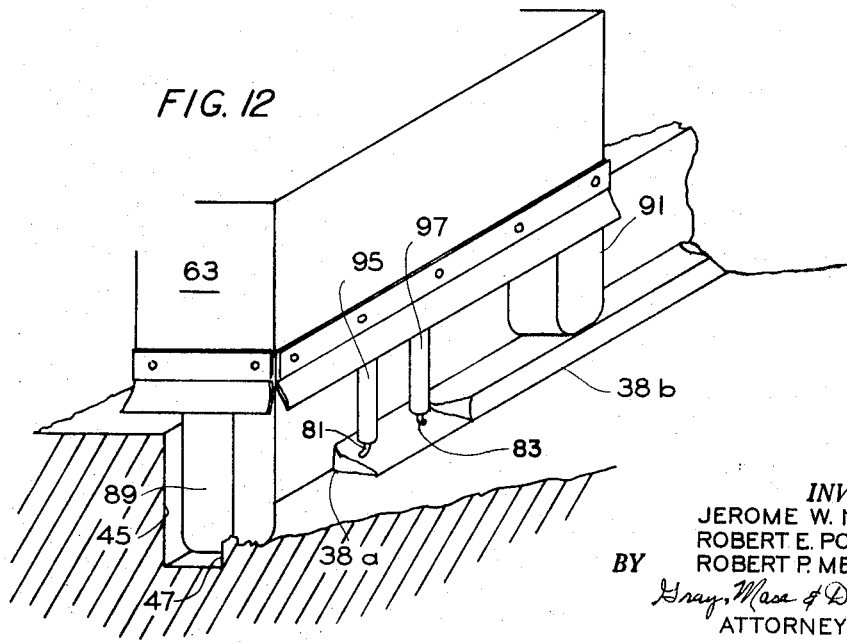

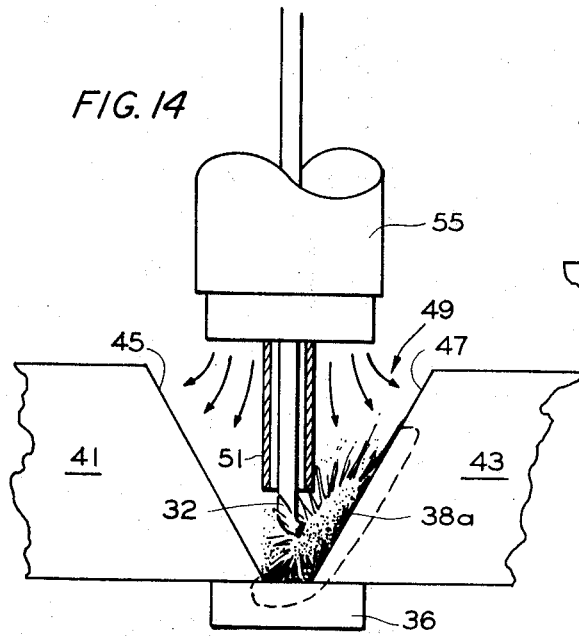
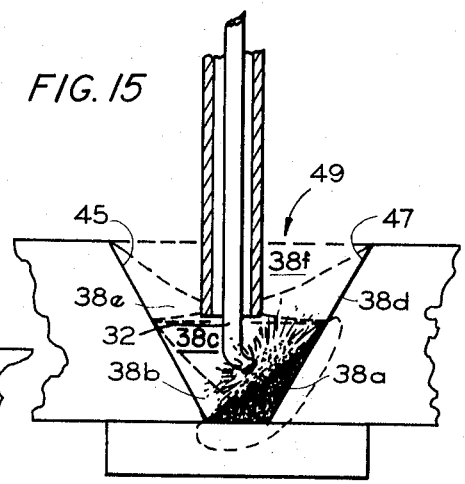
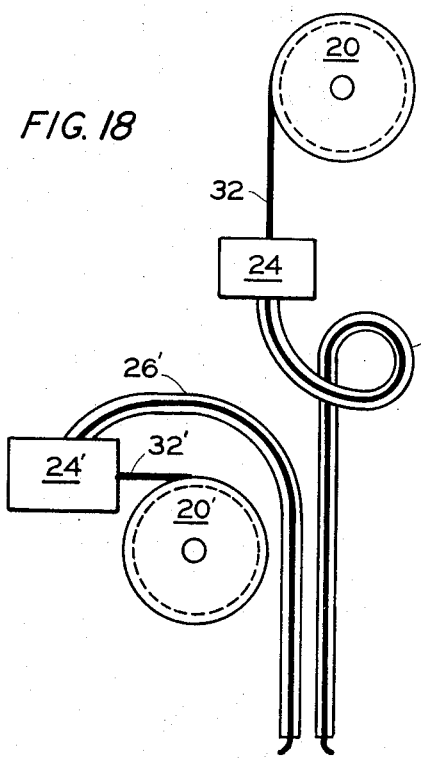
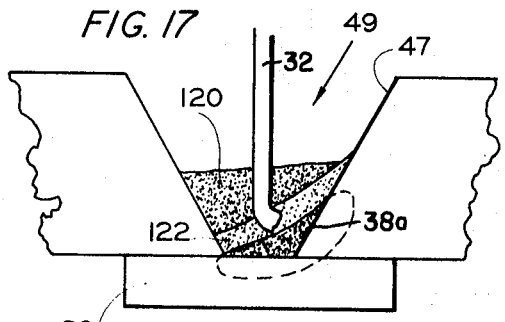
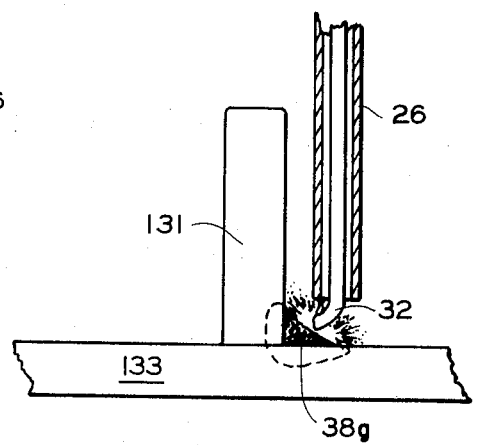

WELDING METHOD AND APPARATUS

This application is a continuation-in-part of the copending application Ser. No. 570,868, filed Aug. 8, 1966.

BACKGROUND OF THE INVENTION

This invention relates to a method and apparatus for consumable wire welding wherein a stable arc is maintained to produce a weld having uniformly sound adherence to the sidewalls of the members being welded.

In consumable wire welding, wire rod is fed continuously from a spool so as to emerge in the weld area to strike an arc with a workpiece or melt in a source of intense heat in the weld area. The wire rod melts off to deposit molten material in the weld area. Because the wire rod must be coiled, some set is introduced to the wire being fed and some lateral twisting motion is imparted thereto. By using large diameter coils (e.g., 15 inches) in consumable electrode welding, the small amount of set introduced thereby is sometimes adjusted with the length of a contact tube to provide electrical contact near the burn-off end of the wire and minimal heating of the wire. However, the set tends to be variable and the lateral twisting motion causes the end of the wire emerging in the area of the weld joint to face the members forming the weld joint at various angles and strike arcs with different portions of the weld joint. The lateral distance of the burn-off end of the wire from the sidewalls of the weld joint and the longitudinal distance from the base of the weld joint varies. When the emergent angle of the wire rod varies, the arc length tends to change and the arc moves up and down the walls. At one extreme, where the emergent angle points the wire end toward the sidewalls, gouging occurs. The sidewall opposite the gouged sidewall furnishes the other extreme by reason of inadequate fusion for lack of weld metal.

To compensate for movement of the burn-off end of the wire rod, excessive heat input can be used to assure flow of metal to the sidewalls and resultant adherence thereto. The excess heat requirement increases the power needed, enlarges the weld heat affected zone, and increases the likelihood of distortion. Often, straightening means such as drive rolls, special confining members, or the like are interposed between the source of the wire and the burn-off end to insure that straight wire emerges in the weld joint. Specially designed contact tubes are used therewith to insure the requisite electrical contact near the burn-off end of the wire. These devices cannot remove all of the set imparted to the wire by coiling and do not insure complete lack of movement because they are somewhat removed from the end of the wire emerging in the weld joint. Further, even where the straightness of the wire can be controlled within reasonable limits by manipulation of other variables, sidewall adherence can be a problem in certain welding processes. For example, in welding with a consumable electrode in the submerged melt process, large power requirements are needed to furnish the heat required to flow metal to the walls of the weld joint or careful control of the position of the electrode is required. In the latter case, it is difficult to obtain adequate clearance for the welding equipment when one of the sidewalls forms a "blind side" as in welding a fixture to a larger body.

One consumable electrode process in which the aforesaid problems related to uncontrollable wire movement are noted particularly is the narrow-gap welding process for downhand welding and out-of-position welding as described in copending application Ser. No. 498,734, now U. S. Pat. No. 3,328,556, wherein relatively continuous welding is performed automatically or semiautomatically in a narrow groove opening. The aforesaid process is characterized by the use of the low heat input operating with a consumable electrode in the spray transfer range to achieve optimum high mechanical properties and narrow heat affected zones. In the process described, uniformly adherent weld metal must be deposited to a substantial depth. Further, the close spacing of the sidewalls of the weld joint and the small bevel angles used can make the sidewall gouging problem more serious. Even with the close sidewall spacing, the electrode must travel in close proximity to the sidewall to insure fusion thereat. In addition to sidewall gouging, arcing with the sidewalls is an undesirable side effect of travel close to the sidewalls.

It is a feature of this invention that a consumable electrode process is provided wherein a uniform depth of fusion is achieved to the sidewalls forming the weld joint.

It is yet another feature of this invention that a consumable electrode process is provided wherein the consumable electrode may travel at a convenient lateral distance from the sidewalls.

It is still another feature of this invention that a consumable electrode process is provided wherein a consumable electrode having a permanent set imparted thereto may be oscillated about its longitudinal axis during feeding to provide uniform deposition of weld metal within the weld joint.

SUMMARY OF THE INVENTION

In its broadest aspects, the present invention relates to a consumable wire rod having a constant predetermined permanent set imparted thereto such that the end of an arcuate portion thereof always is directed toward a wall of one of the members forming the weld joint. As used herein the terms "set" and "cast" are used interchangeably and are meant to define the strain in a wire imparted thereto upon exceeding its elastic limit causing it to assume a configuration dictated by the amount of strain in the wire. Further, in referring to the wire as directed toward a sidewall, it is meant to define wire deflected away from its vertical axis but not necessarily directed at a sidewall. When the consumable wire of the invention is fed coaxially through a confining sleeve, it emerges from the base thereof at a predetermined constant arcuate angle. The invention further relates to feeding said wire electrode wire into a joint gap such that a stable arc is always directed toward the sidewall of the joint at a predetermined distance from the base of the joint. The invention also relates to oscillating said electrode wire about its longitudinal axis and within said joint during feeding of said wire to obtain uniform distribution of weld metal.

In the Drawings:

FIG. 1 is an elevational view illustrating means for producing electrode wire having a predetermined arcuate portion.

FIG. 2 is an elevational view similar to FIG. 1 demonstrating by solid and dashed lines the manner of adjusting the predetermined angle of the arcuate portion.

FIG. 3 is an elevational view illustrating still different means for producing electrode wire having a predetermined arcuate portion.

FIG. 4 is an elevational view illustrating another means for producing electrode wire having a predetermined arcuate portion.

FIG. 5 is an elevational view illustrating still another means for producing electrode wire having a predetermined arcuate portion.

FIG. 6 is an elevational view illustrating means for varying the predetermined angle of the arcuate portion of the electrode wire by 180°.

FIGS. 7 and 8 are elevational views showing examples of welding by successive passes using alternately directed wire electrodes. FIG. 7 shows a first pass with a wire electrode directed at one sidewall, and FIG. 8 shows a second pass with a wire electrode directed at 180° to the wire electrode of FIG. 6.

FIG. 9 is an elevational view illustrating means for oscillating the electrode having a permanent set imparted thereto about its longitudinal axis during feeding of the electrode.

FIG. 10 is a plan view showing the path of the permanent set electrode of FIG. 9 as it is oscillated in the joint.

FIG. 11 is a perspective view of multiple wire welding apparatus with alternately directed electrodes according to the invention.

FIG. 12 is a sectional view through a joint showing enlarged detail of multiple wire welding in an apparatus similar to that of FIG. 11.

FIG. 13 is an elevational view with parts partially broken away showing the invention in connection with welding using the tungsten arc process.

FIG. 14 is an elevational view showing the invention in connection with consumable electrode welding of vee-joints.

FIG. 15 is an elevational view showing the filling of the vee-joint of FIG. 14 in accordance with the invention.

FIG. 16 is an elevational view showing the invention in connection with the consumable electrode welding of tee-joints FIG. 17 is an elevational view showing the invention in connection with submerged melt welding.

FIG. 18 is an elevational view illustrating an alternate method of producing a predetermined uniform angle in the arcuate portion of an electrode wire.

In the drawings, the same reference numerals are applied to identical parts in all embodiments and such identically numbered parts are substantially identical in structure, function, and operation. Therefore, to eliminate confusing duplication, these parts, their interrelationship and their function will be described only in conjunction with a single embodiment, such description applying to all embodiments where these parts appear.

In one embodiment of the invention a permanent set is imparted to the wire by feeding the wire to forming means at a predetermined angle such that wire having a uniform arcuate cast is available at the weld site. The predetermined angle should be such that wire allowed to coil at the weld site (e.g., without allowing the wire to strike the sidewalls or burn off by formation of an arc) has a potential coil diameter dictated by the forming means.

Referring to FIG. 1, the wire 32 coiled about a spool 20 is fed substantially perpendicular to an idler roll 22 and is fed therearound and directed at an angle of 90° to the drive rolls 24–24. To insure that the wire 32 is fed at about 90° to the drive rolls 24–24, the level of the base of the idler roll 22 is maintained about even with the top of the drive rolls 24–24. From the drive rolls 24–24, the wire 32 may be fed through tubing and suitable contact tubes or the like represented by a confining sleeve 26 of FIG. 1. The confining sleeve 26 serves to maintain straight alignment of the wire. For purposes of illustrating the principles involved in producing a permanent set according to an embodiment of the invention, the wire 32 of FIG. 1 is shown emerging from the sleeve 26 in a coil 28. The dashed line represents the approximate burn-off point during welding operations. The permanent set shown by the coil 28 is imparted by the drive rolls 24–24 while the idler roll 22 acts to properly direct the wire and insures a lack of spiraling.

In FIG. 2, solid and dashed lines are used to represent a manner of varying the permanent set of the wire 32 by varying the position of the idler roll 22 to adjust the angle at which the wire 32 enters the drive rolls 24–24. In the position represented by the solid line of FIG. 2, showing the wire 32 entering the drive rolls 24–24 at an angle $\theta$ the cast of the wire is such that the emergent arcuate angle $\alpha$ of coil 28' increases from that shown by coil 28 in FIG. 1. In the dashed representation of FIG. 2, the wire 32 enters the drive rolls at an angle $\theta'$ to further change the shape of the coil 28'' and emergent angle $\alpha'$. For preferred welding wherein sidewall adherence is assured, the permanent set in the wire 32 should be such as to provide a diameter of coil 28 of from 4 to 10 inches, preferably of from 6 to 10 inches.

Referring to FIG. 3, the wire 32 enters the forming rolls 30–30 directly from a coil wound on spool 20 to have a permanent set imparted thereto and passes to the drive rolls 24–24. Because the amount of set is controlled by the diameter of the forming rolls 30–30, changes in the amount of set can be made merely by interchanging the forming rolls 30–30 without need for disturbing the drive rolls 24–24.

Referring to the embodiment of FIG. 4, wire 32 is wrapped around a single forming roll 34 having a diameter dictated by the amount of set desired in the wire and is fed by the drive rolls 24–24.

The nature of the forming equipment is seen to be dependent on the amount of cast desired in the wire, the properties of the wire and the diameter of the wire. The diameter of the wire can be of any size consistent with those used for consumable electrode welding and is limited only by the size of the forming equipment needed to impart a permanent cast. For given forming equipment, the principle wire properties that must be considered to provide the requisite sidewall adherence associated with said diameters of 4 to 10 inches are tensile strength and degree of cold work or stiffness of the wire. Wire that is too soft, such as fully annealed wire, will not take a permanent set, thereby tending to straighten out as it passes from the forming means through a confining sleeve. Wire that is too hard will not take any consistent degree of permanent set in the forming equipment.

In another embodiment of the invention, wire wound about a spool has a predetermined set selected to provide the desired arcuate contour dictated by the diameter of the spool and those properties of the wire described previously in connection with forming. This eliminates the need for forming equipment as shown in connection with FIGS. 1 to 4 wherein large spools or wire having a random set are used.

Referring to FIG. 5, the wire 32 from a spool 20 having wire previously wrapped there around to achieve a permanent constant set is fed directly substantially perpendicular to the vertical axis of the confining sleeve 26. A guide 27 affixed to the entrance end of the confining sleeve 26 insures proper alignment of the wire 32 into the confining sleeve 26.

Welding can be done using a single wire having a permanent set imparted thereto or using a number of wires thus formed. Thus, various combinations of forming means such as combinations of those shown in FIGS. 1 to 5 may be used with multiple wires.

Referring to FIG. 6, a wire 32 is fed at 90° to drive rolls 24–24 in the manner of FIG. 1. To change the angle of the arcuate portion of the wire 32 emerging from the confining sleeve 26 by 180°, slack is taken in the electrode wire 32 at the idler pulley 22 and the spool 20 is rotated 180° about a vertical axis to feed wire around idler pulley 22'.

Although the invention is capable of a variety of expressions, an embodiment thereof will be described particularly in connection with the narrow gap welding process as in FIGS. 7 and 8 wherein two plates 41 and 43 are aligned to form a narrow gap having sides 45 and 47.

Referring to FIG. 7, a contact tube 51 and emergent wire electrode 32 fed from spool 20 in the manner described in FIG. 1 are immersed in the gap 49. The permanent cast imparted to the wire electrode by the drive rolls 24–24 causes the burn-off end of the emergent wire electrode 32 to face the sidewall 47. Shielding gas (represented by the arrows 53) flows down into the gap 49 of the joint from the telescopic concentric gas-shielding tube 55 positioned thereabove.

Following insertion of the contact tube 51 in the joint, electrical power is furnished from the power source and a first welding pass is made in gap 49. Molten metal 38a begins to deposit against the sidewall 47 and flows downwardly to fuse against the backup plate 36 as the contact tube 51 travels along the joint formed by the gap 49. Wire electrode 32 is fed continuously as the contact tube 51 travels along the gap 49 of the weld joint and emerges therefrom at a constant angle throughout the pass. Upon completion of the pass a layer of the metal 38a is provided adherent to the sidewalls 47 at a uniform depth and adherent across the surface of the backup plate 36. Only a minor proportion of the weld metal is adherent to the opposing sidewall 45.

Referring to FIG. 8 a second pass is made using the wire 32 with a cast directed at about 180° to the cast shown for the electrode 32 in FIG. 7. During the pass, the wire 32 deposits metal 38b on the surface of the weld metal 38a deposited in the pass of FIG. 7. Following completion of the pass, oppositely tapered, wedge-shaped metal layers 38a and 38b are stacked one on top of the other to form a rectangular-shaped deposit firmly adherent to the sidewalls 45 and 47.

The remainder of the welding passes are made with alternate passes each having oppositely directed emergent wire electrode portions to fill the gap 49 of the weld joint. In a typical narrow gap welding operation using a single electrode wire as in FIGS. 7 or 8, the following wire properties are found suitable to enable the wire to receive a permanent set according to the invention:

| | |
|---|---|
| Tensile Strength, p.s.i. | 125—130,000 |
| Cold work, percent | 18—30 |
| Initial coil diameter, in. | 15—30 |
| Max. helix diameter, in. | 4 |
| Diameter | 0.035 |

Often in the welding of metal members an oscillating or weaving weld deposition is desirable. The permanent set of the electrode wire of the present invention allows such oscillating weld deposition to be done in a unique manner as illustrated in FIGS. 9 and 10. If the electrode wire 32, having a permanent set imparted thereto, is oscillated about its longitudinal axis as it passes through the confining sleeve 26, the emerging arcuate portion of the wire will travel in a swinging, arcuate pattern within the joint 49 as shown in FIG. 10. This allows the confining sleeve 26 to remain in a fixed lateral position within the joint which in turn allows oscillating weld deposition in much narrower gaps than heretofore possible. Previous oscillating weld methods involve moving the entire confining sleeve from side to side. Where the confining sleeve travels from side to side within the joint, larger weld gaps are necessary. The present invention is not limited by gap size and may be used effectively in the recently developed narrow gap welding processes.

Oscillation of the electrode wire 32 according to the present invention requires much less complicated apparatus than was required with previous oscillating weld methods. A typical apparatus for oscillating a permanent set electrode wire is shown in FIG. 9. In this embodiment the spool 20, the idler roll 22 and the drive rolls 24-24 are positioned in substantially the same plane as the joint 49 such that the emerging arcuate portion of the electrode wire 32 is generally parallel with the sidewalls 45 and 47. The idler roll 22 is located very near the drive rolls 24-24 and may even be directly above one of the drive rolls. Both the idler roll 22 and the drive rolls 24-24 are journaled in the frame member 11 which is pivotally mounted on the carriage 13 (only partly shown) at point A directly above the confining sleeve 26. One end of the spring 15 is attached to the frame 11 at a point outward of the pivot axis and the other end is attached to the carriage 13. The spring 15 is so positioned as to urge the frame 11 to pivot about point A and toward cam 17. The cam 17 bears against the frame 11 at a point outward of the pivot axis and is driven by motor means (not shown) at a rate corresponding to the desired rate of oscillation of the electrode wire 32. As the cam 17 rotates, the frame 11 is oscillated back and forth about pivot point A as shown by the dashed arrow 19. The pivotal movement of frame 11 produces oscillation of the wire 32 about its longitudinal axis whereby the emerging arcuate portion of the wire travels in an arcuate pattern (shown in FIG. 10) within the joint 49. This oscillating movement produces a continuous weld metal layer 38 of uniform depth. The amount of lateral travel as well as the speed of travel of the arcuate portion within the joint may be varied by using cams of various sizes and configurations. Of course the oscillating movement may be produced by means other than the cam arrangement just described without departing from the scope of this invention.

Referring to FIGS. 11 and 12, wire electrodes comprising lead wire 81 and trail wire 83 fed from the spools 20 and 20', respectively, are directed over idler rolls 22 and 22' and into the drive rolls 24-24 and 24'-24' at an angle of 90° thereto and at an angle of 180° with respect to one another. The electrode wires 81 and 83 pass from the drive rolls 24-24 and 24'-24' through the guide tubes 71 and 73 positioned within a barrel 85 affixed to a frame 77 of a floating welding head 61. The welding head 61 is mechanically coupled to a carriage (not shown) by means of the parallelogram mount 65 and the plate 67. The guides 89 and 91 are secured to the head 61 and ride in the joint 49 to mechanically position the head 61. The contact tubes 95 and 97 are mounted in a shielding gas cup 63 which is suspended from the frame 77 a short distance from the base of the barrel 85. The contact tubes 95 and 97 are positioned substantially coaxially with the guide tubes 71 and 73 such that the electrode wires exit from the guide tubes and directly enter the contact tubes. Lead wire 81 emerges from a contact tube 95 having an arcuate portion at 180° to the arcuate portion of trail wire 83 emerging from contact tube 97. The shielding gas cup 63 is mounted to float with respect to the head 61 and confines an inert atmosphere in the weld zone. The welding head 61 is positioned laterally with respect to the joint by the bar 105 that serves as a guide for a roller 107. A more complete description of the welding head itself can be found in U. S. Pat. No. 3,328,556.

In operation, the carriage (not shown) attached to the plate 67 guides the welding head 61 through the gap 49 by means of the roller 107 and guide bar 105 and the guides 89 and 91. The weld metal 38a deposited from the lead wire 81 fuses to a uniform depth along the sidewall 45 and flows uniformly downwardly along the base of the joint toward the opposing sidewall 47. The weld metal 38b from the trail wire 83 fuses to the sidewall 47 and flows to a uniform depth about even with the depth of the weld metal 38a at the sidewall 45. This leaves a substantially uniform depth of weld metal from the sidewall 45 to the sidewall 47 permanently adherent thereto. Subsequent passes in the manner described provide a filled weld joint.

In FIG. 13, the invention is shown in connection with narrow gap welding using a tungsten electrode 110. The wire 32 is fed continuously from a spool 20 to pass around the idler roll 22 and has a permanent set imparted thereto by drive rolls 24-24 from which the wire 32 passes through the guide tubes 26 to ultimately emerge directly in the arc 112. Upon escaping the confinement of the guide tube 26, the wire 32 assumes an arcuate angle in the arc to direct the weld metal 38a at the sidewall 47. Subsequent passes are made with the wire 32 alternately directed toward each sidewall as described in connection with FIGS. 7 and 8, or the wire 32 may be oscillated as described in connection with FIGS. 9 and 10.

Referring to FIGS. 14, 15, 16, and 17 consumable electrode welding of vee-joints and tee-joints are shown according to the invention. In FIG. 14, suitable forming equipment (not shown) is used to impart a permanent set to the electrode wire 32 emerging from a contact tube 51 provided with a telescopic gas shield 55. The weld metal 38a is deposited against the sidewall 47 from the arcuate portion of electrode 32 to flow across the base plate 36. Subsequent passes are made using the wire 32, each pass having alternately directed arcuate portions serving to fill the gap 49 of the weld joint.

In FIG. 15, the weld metal 38a is deposited against the sidewall 47 of a vee-joint 49 from the wire electrode 32. Weld metal deposited during subsequent passes is represented by the weld zones 38b through 38f. The weld metal 38b is deposited against the sidewall 45 by directing the arcuate portion of the wire 32 at 180° to the direction used for depositing the weld metal 38a. This can be done as described in connection with FIG. 6. For the weld metal 38c the wire 32 is removed from the forming equipment and weld metal is deposited in the conventional manner to fill the cavity formed between the surface of weld metal 38a and 38b. The sequence of steps described for welds 38a, 38b, and 38c is repeated for weld metal at 38d, 38e, and 38f.

From FIG. 15, it will be appreciated that any sequence of passes can be made to produce weld metal of varying geometry. For welding vee-joints, adjustment of forming equipment compensates for changes in the size of the weld joint as it becomes filled. Similarly, any number of electrodes passing through various combinations of separate forming equipment or combinations where one electrode may not pass through forming equipment may be used. In any event, a joint characterized by uniformly sound sidewall adherence is obtained.

Referring to FIG. 16, consumable welding of tee-joints is shown according to the invention whereby wire 32 having a permanent set imparted thereto by means not shown travels along the tee-joint formed by members 131 and 133 to deposit weld metal 38g uniformly adherent to the vertical member 131 and the horizontal base 133. Because burn-off occurs at the end of the arcuate portion of the wire 32, the end is close to the vertical member 131 whereas the straight portion of the wire 32 is confined in confining sleeve 26 in a plane further laterally removed from the vertical member 131 than the point at which the burn-off end is located.

In FIG. 17, an embodiment of the invention is shown in connection with submerged melt welding of vee-joints. The electrode wire 32 having a permanent set imparted thereto according to the invention is continuously fed through granular flux 120 as it travels along the weld joint 49. The heat available at the end of the arcuate portion of the electrode 32 causes a molten slag layer 122 to form from the flux 120 through which weld metal 38a from the electrode 32 flows to deposit against the sidewall 47 and the base plate 36. Subsequent passes as previously described are made to fill the weld joint. Because weld metal is deposited directly against the sidewalls, the large amount of heat needed to flow metal from conventional, relatively straight electrodes to the sidewalls is reduced.

Referring to FIG. 18, for an alternate method of producing a permanent set or cast particularly applicable to a two-wire system, wire electrodes 32 and 32' enter the forming equipment 24 and 24' from the spools 20 and 20' respectively. The wires are formed to have a permanent set or cast imparted thereto and are fed through confining sleeves 26 and 26' to conform to the set produced from the forming equipment 24 and 24' and properly orient the wires 32 and 32'. The confining sleeves 26 and 26' are essentially the same as conventional confining sleeves or contact tubes shown in the other FIGS. with the exception that the entrance end of the sleeves has been extended and formed to guide the permanent set of the wire electrodes passing therethrough toward one of the gap sidewalls. As shown, the guide tube 26' for the wire 32' curves approximately 90° in directing the wire 32' so that as the wire 32' comes out of the confining sleeve 26' it will be directed into the sidewall of the joint. The confining sleeve 26 for the wire 32 is looped 270 degrees to orientate the wire-cast direction opposite to that of the wire 32' so that the wire 32 comes out of the confining sleeve 26 toward the opposite sidewall. It should be noted that the oscillating method of weld deposition previously described may be achieved with the looped confining sleeve 26. Simply oscillating the central portion of the 270 degree loop from side to side will produce a corresponding oscillation of the emerging arcuate portion.

In addition to improved economy and weld quality, this invention offers many other advantages. The arc is more stable and tends to stay at the bottom of the joint. If the arc tends to move up the sidewall, the arc length becomes greater because the electrode wire moves away from the sidewall. The increased arc length requires an increased arc voltage to sustain the new position. The constant-potential type power supply cannot supply the necessary increased arc voltage. The burn-off rate of the wire decreases and the arc moves back down to its normal position in the joint. This increased arc stability greatly reduces the chance of lack of fusion in the weld due to arc movement and also eliminates arc gouges in the sidewall which can cause difficulties in subsequent weld passes.

The invention allows for more clearance for welding equipment when welding against a blind sidewall or in welding tee-joints. Further, the occurrence of sidewall arcing is minimized in these situations.

In making vee-joints by means of consumable electrode welding, the invention provides considerable advantage by its ability to reduce the input of heat to the weld area. Because of reduced heat input and the ability to provide metal directly at the sidewalls, the included angle of the vee can be decreased. This reduces the amount of weld metal that is needed in the weld joint as well as distortion of the metal members. The reduced heat input also provides economies in processes such as submerged melt welding by reducing the power requirements needed to assure sidewall adherence and reducing the size of the heat affected zone.

Numerous other uses and advantages of this invention will be apparent. For example, the invention may be used in connection with other welding processes such as plasma, gas, or laser and in any variety of weld joints in gap or out of gap. It will be understood that various changes in the details, materials, steps, and arrangements of parts, which have been herein described and illustrated in order to explain the nature of the invention may be made within the principles and scope of the invention.

We claim:

1. In the method of consumable electrode narrow gap welding wherein a consumable wire welding electrode connected to a source of power is continuously guided through a contact tube and into a narrow gap formed between metal members to deposit metal from said consumable wire electrode in said gap by striking an arc with said metal members, the improvement comprising imparting a permanent set to said consumable wire prior to passing said wire through said contact tube such that the portion of the wire emerging from said contact tube has an arcuate shape determined by said permanent set, and oscillating said wire about its longitudinal axis whereby the emerging arcuate portion of said wire swings from side to side within said gap.

2. The method of claim 1 wherein said consumable wire electrode has a permanent set imparted thereto to provide a wire coil diameter of about 4 to 10 inches.

3. A method of welding metal members comprising the steps of:
   a. aligning said metal members to form a gap;
   b. continuously feeding at least one consumable welding wire from a source of wire through a contact tube, said wire having a permanent set imparted thereto prior to entering the contact tube;
   c. guiding said wire into said gap with said wire emerging from the contact tube and extending into said gap, the emerging portion of said wire having an arcuate shape determined by said permanent set;
   d. oscillating said wire about its longitudinal axis whereby said emerging arcuate portion swings from side to side within said gap; and
   e. melting said emerging arcuate portion of said wire to deposit weld metal in said gap.

4. A method of welding metal members as in claim 3 wherein said source of wire is a spool having wire wound thereabout, said wire having a permanent predetermined set.

5. A method of welding metal members as in claim 3 wherein said wire is directed from said source of wire to forming means to impart a permanent set thereto.

6. The method of claim 5 wherein said wire is directed to forming means comprising drive rolls at an angle determined by the desired permanent set.

7. The method of claim 5 wherein said wire is directed to forming means comprising forming rolls having a diameter determined by the desired permanent set.

8. The method of claim 5 wherein said wire is fed 360° about forming means comprising a single forming roll having a diameter determined by the desired permanent set.

9. A method of welding metal members as in claim 3 wherein said permanent set imparted to said wire provides a wire coil diameter of about 4 to 10 inches.

10. A method of welding metal members as in claim 3 wherein said wire is connected to a power source to strike an arc between said emerging arcuate portion of said wire and said metal members.

11. A method of welding metal members as in claim 3 wherein the emerging arcuate portion of said wire is fed directly into a source of intense heat to melt and deposit weld metal in said gap.

12. The method of claim 11 wherein said source of intense heat is the arc formed between a tungsten electrode and said metal members.

13. In a consumable electrode welding apparatus having means for feeding a consumable electrode wire through a contact tube and into a gap formed between metal members, the improvement comprising means for imparting a permanent set to said consumable wire prior to passing said wire through said contact tube such that the portion of the wire emerging from said contact tube has an arcuate shape determined by said permanent set and including means for oscillating said consumable wire about its longitudinal axis whereby the emerging arcuate portion of said wire swings from side to side within said gap.

14. The method of claim 18 wherein said wire is guided into said gap by an idler roll positioned between said contact tube and said source of wire and wherein said wire is oscillated by moving said idler roll with a cam drive means.

15. The method of claim 3 wherein the contact tube includes an extension thereof at the entrance end of said contact tube, said extension being formed to guide said wire, and wherein said wire is oscillated by moving a portion of said extension from side to side.

UNITED STATES PATENT OFFICE
CERTIFICATE OF CORRECTION

Patent No. 3,567,900　　　　　　　　　　Dated　March 2, 1971

Inventor(s)　Jerome W. Nelson, Robert E. Pollock and Robert P. Meister

It is certified that error appears in the above-identified patent and that said Letters Patent are hereby corrected as shown below:

Column 10, line 7, "18" should read -- 3 --.

Signed and sealed this 22nd day of June 1971.

(SEAL)
Attest:

EDWARD M. FLETCHER, JR.　　　　　　　WILLIAM E. SCHUYLER, JR.
Attesting Officer　　　　　　　　　　Commissioner of Patents